Sept. 20, 1971  J. P. HEGGEN  3,605,519
CONTROL FOR DUAL HYDROSTATIC DRIVE
Filed Jan. 26, 1970  5 Sheets-Sheet 1

INVENTOR
JOHN P. HEGGEN
BY Robert H. Johnson
ATTORNEY

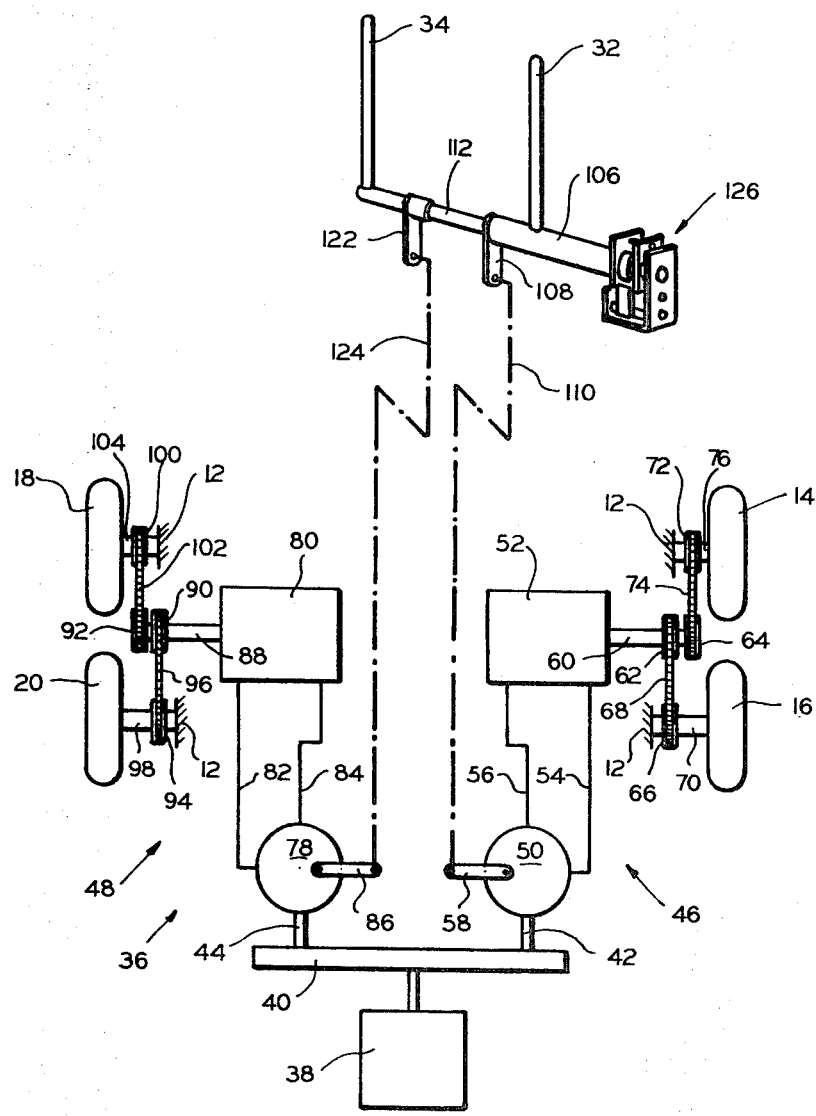

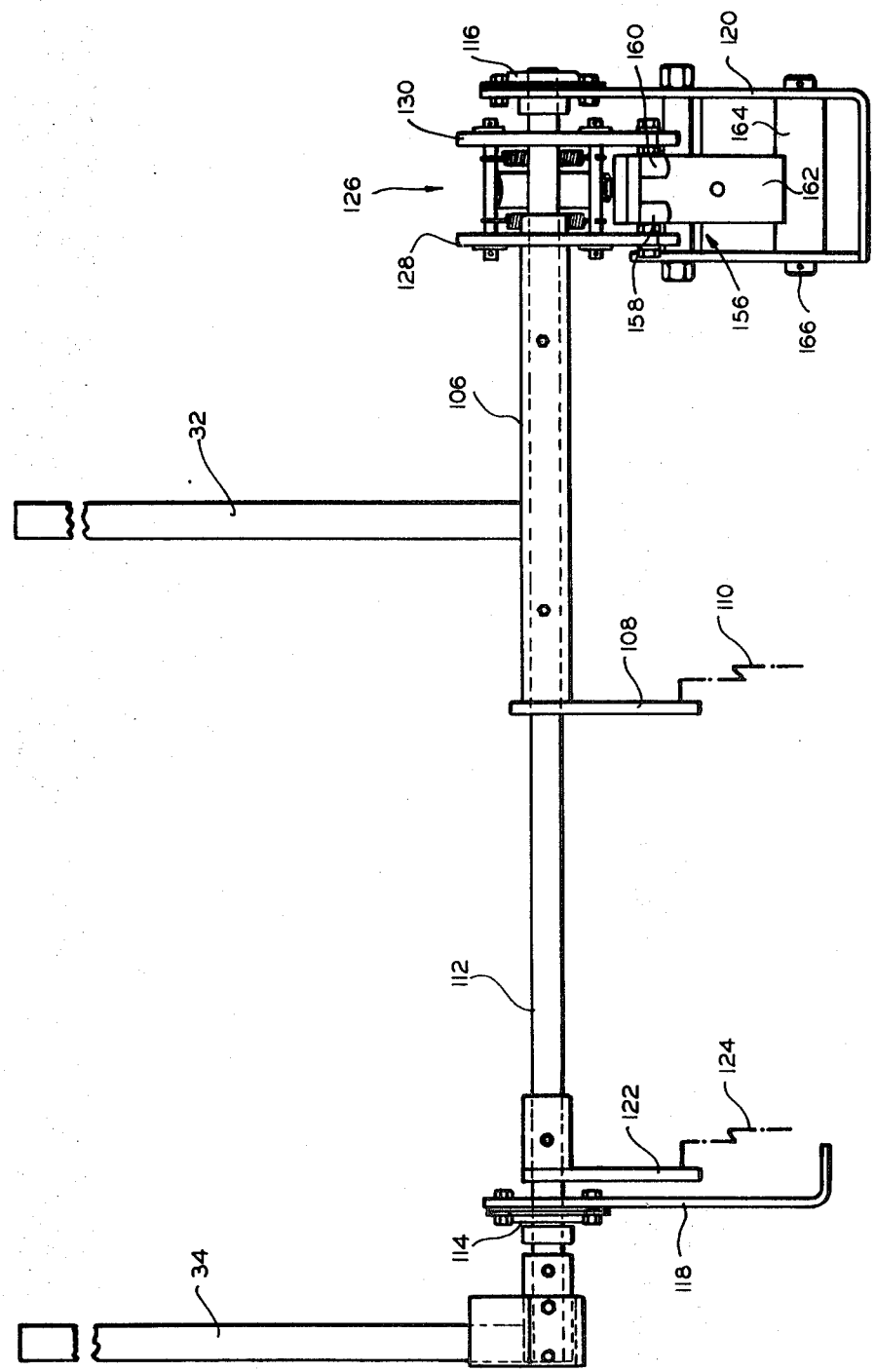

Sept. 20, 1971    J. P. HEGGEN    3,605,519
CONTROL FOR DUAL HYDROSTATIC DRIVE
Filed Jan. 26, 1970    5 Sheets-Sheet 4

*INVENTOR*
JOHN P. HEGGEN
BY *Robert H. Johnson*

ATTORNEY

Sept. 20, 1971   J. P. HEGGEN   3,605,519
CONTROL FOR DUAL HYDROSTATIC DRIVE
Filed Jan. 26, 1970   5 Sheets-Sheet 5

INVENTOR
JOHN P. HEGGEN
BY Robert H. Johnson
ATTORNEY ns on one side of the vehicle different from the other side.

United States Patent Office 3,605,519
Patented Sept. 20, 1971

3,605,519
CONTROL FOR DUAL HYDROSTATIC DRIVE
John P. Heggen, Lisbon, N. Dak., assignor to
Clark Equipment Company
Filed Jan. 26, 1970, Ser. No. 5,459
Int. Cl. G05g 13/00
U.S. Cl. 74—480R                             8 Claims

ABSTRACT OF THE DISCLOSURE

Mechanism for controlling two separate power outputs together or independently, including a pair of plates mounted for rotation, a pair of converging slots in each plate, a rod extending through each pair of corresponding slots in the plates and tension spring means connected between the pair of rods.

BACKGROUND OF THE INVENTION

The field of art to which this invention relates includes control systems, and more specifically mechanical control systems for dual hydrostatic transmissions.

A highly maneuverable four-wheeled vehicle can be provided by utilizing differential steering. That is, the wheels on one side of the vehicle can be driven at velocities and directions of rotation independently of the wheels on the other side of the vehicle. An example of such vehicle which has been extremely successful is disclosed in U.S. Pat. No. 3,231,117, which issued on Jan. 25, 1966, in the names of C. E. Melroe and L. J. Keller.

In the case where two separate hydrostatic transmissions are incorporated in such a vehicle, it is desirable to have the controls for each transmission operable together without any lag, as well as independently. Otherwise, it is difficult to steer the vehicle, especially at high speed. Also, it is desirable to limit the differential between the velocities of the wheels on opposite sides of the vehicle.

It is, therefore, a principal object of my invention to provide a simple mechanism which connects two separate hydrostatic transmissions for operation together without any lag, or independently.

SUMMARY OF THE INVENTION

In carrying out my invention in a preferred embodiment, I provide a pair of rotatable shafts to which a pair of plates are fixed. Each plate has a pair of converging slots therein which register with corresponding slots in the other plate. A rod extends through each pair of corresponding slots and at least one tension spring is connected between the rods.

The above and other objects, features and advantages of my invention will be more readily understood by persons skilled in the art when the detailed description is considered together with the drawing.

DESCRIPTION OF THE DRAWING

FIG. 2 is a schematic diagram of the power train and controls for the loader shown in FIG. 1, FIG. 3 shows my novel control mechanism.

Referring to FIGS. 1 and 2, the reference numeral 10 denotes generally a compact four-wheeled front end loader having a body 12 which is supported by a pair of drive wheels 14 and 16 on one side thereof and a pair of drive wheels 18 and 20 on the other side thereof. Loader 10 includes a bucket 22 connected to a pair of boom arms 24 which are in turn pivotally connected to a pair of upright stanchions 26 located adjacent the rear of body 12. Located on body 12 is an operator's station 28 which includes a seat 30 and a pair of speed and direction control handles 32 and 34.

Figure 1:
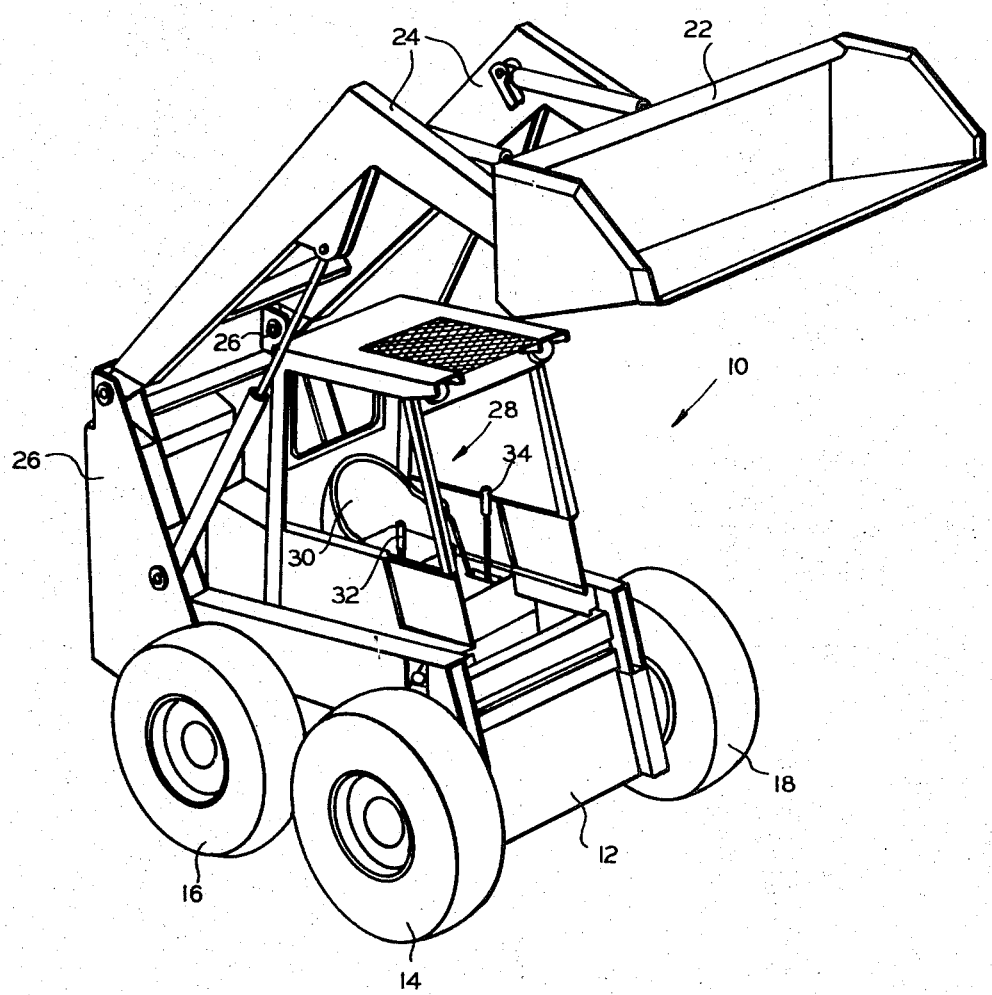
FIG. 1 shows a compact four-wheeled front end loader embodying my invention.
Figure 5:
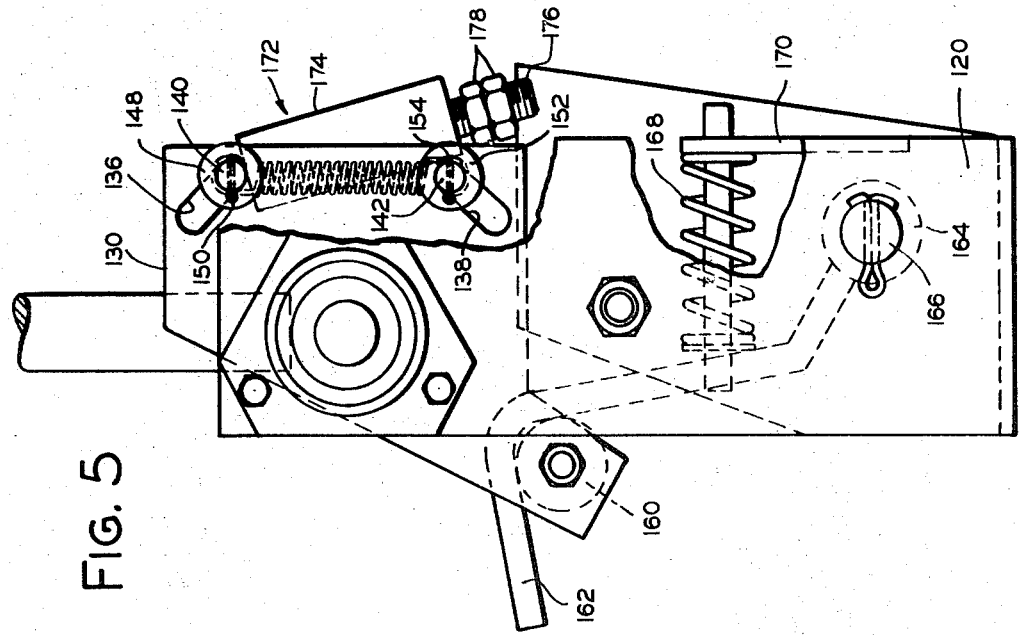
FIG. 5 is a right end view of the mechanism shown in FIG. 4.
Figure 4:
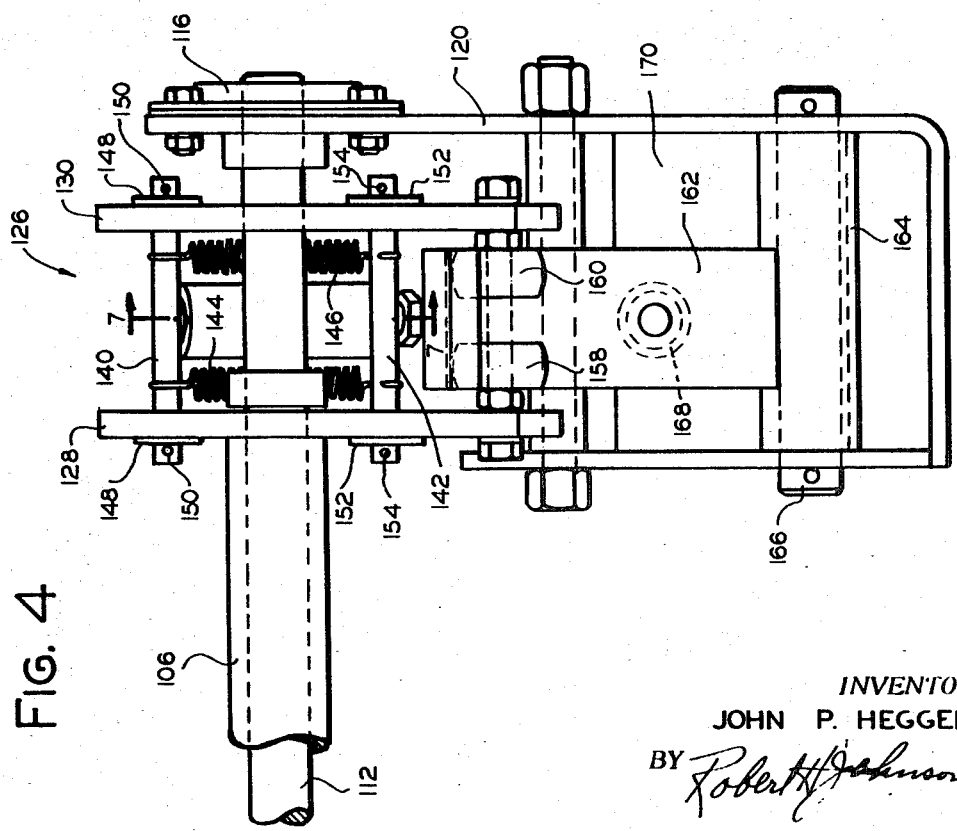
FIG. 4 is an enlarged view of a portion of the control mechanism of FIG. 3.
Figure 6:
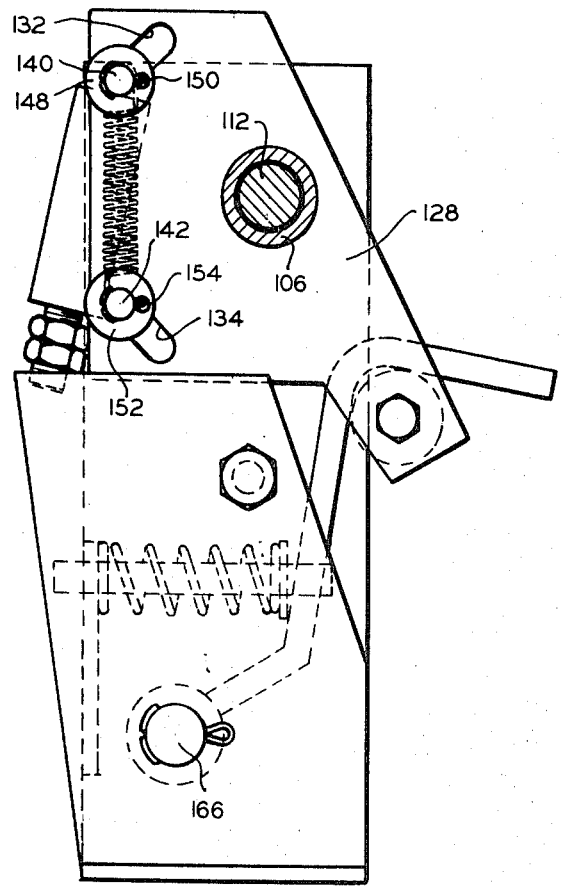
FIG. 6 is a left end view of the mechanism shown in FIG. 4.

Referring now specifically to FIG. 2, the drive train 36 for loader 10 includes a prime mover 38 which preferably is an internal combustion engine which has the crank shaft connected to a transfer gear case 40 to provide two separate power outputs 42 and 44. Drive train 36 also includes two separate hydrostatic transmission portions 46 and 48.

Hydrostatic transmission 46 includes a variable displacement pump 50 which is drivingly connected to output 42. Pump 50 includes a swash plate (not shown) which is connected to a lever arm 58 so that movement of lever 58 changes the angle of the swash plate, and thus the pump output. Connected to pump 50 by conduits 54 and 56 is a fluid motor 52. Motor 52 has a rotatable shaft 60 to which a pair of sprockets 62 and 64 are fixed.

Sprocket 62 is drivingly connected to another sprocket 66 by means of an endless chain 68 which engages the teeth of both sprockets. Sprocket 66 is fixed to a stub axle 70 mounted on body 12 and to which wheel 16 is connected. Similarly, sprocket 64 drivingly engages another sprocket 72 by means of an endless chain 74 which engages the teeth of both sprockets. Sprocket 72 is fixed to a stub axle 76 which is mounted on body 12 and to which wheel 14 is connected.

Hydrostatic transmission 48 has a variable displacement pump 78 drivingly connected to output 44 and a fixed displacement motor 80 which is connected to pump 78 by means of fluid conduits 82 and 84. Pump 78 includes a swash plate (not shown) which is connected to lever arm 86 so that movement there changes the angle of the swash plate and motor 80 includes a rotatable shaft 88 to which a pair of sprockets 90 and 92 are fixed.

Sprocket 90 is drivingly connected to another sprocket 94 by means of an endless chain 96 which engages the teeth of the sprockets. Sprocket 94 is fixed to a stub axle 98 which is mounted on body 12 and to which wheel 20 is connected. Similarly, sprocket 92 is drivingly connected to another sprocket 100 by means of an endless chain 102 which engages the teeth of these sprockets. Sprocket 100 is fixed to a stub axle 104 which is connected to body 12 and to which wheel 18 is connected.

It will be noted that both hydrostatic transmission systems 46 and 48 are of the closed circuit type. While such systems are termed closed, it is nevertheless conventional to provide means for supplying fluid to the systems to make up for loss through leakage, etc. However, such a provision has not been shown since it has no relation to my invention and is conventional and well-known in the art. Also, both systems could have variable displacement motors, if desired, in addition to the variable displacement pumps.

At this point it will be clear that wheels 14 and 16 on one side of the vehicle are connected together for conjoint rotation in the same direction and that wheels 18 and 20 on the other side of the vehicle are connected together for conjoint rotation in the same direction. Now, it is possible to vary the direction and speed of rotation of the pairs of wheels on the opposite sides of vehicle 10 by actuating lever arms 58 and 86 which changes the swash plate angle in pumps 50 and 78. Thus, vehicle 10 can be steered by having the speed or direction of rotation or both for the pair of wheels on one side of the vehicle different from that on the wheels on the other side of the vehicle.

Referring now also to FIG. 3, the angle of the swash plate for pump 50 is controlled by the operator through manipulation of control handle 32 which is connected to a rotatable sleeve shaft 106. Connected to sleeve shaft 106 is a lever arm 108 which is connected to lever arm 58 by means of linkage 110. Similarly, the operator manipulates control handle 34 to vary the angle of the swash plate for pump 78. Control handle 34 is connected to a shaft 112 which is journaled for rotation in a pair of bearings 114 and 116 which are carried by brackets 118 and 120. These bracket are adapted to be mounted at appropriate locations on body 12 of loader 10. Fixed to shaft 112 is a lever arm 122 which is connected by means of linkage 124 to lever arm 86 of motor 80.

Referring additionally to FIGS. 4,5, 6 and 7, shafts 106 and 112 are interconnected by means of mechanism 126 which includes a plate 128 fixed to shaft 106 and a plate 130 fixed to shaft 112. Plate 128 has disposed therein a pair of converging slots 132 and 134. Similarly, plate 130 has disposed therein a pair of converging slots 136 and 138 which register with corresponding ones of slots 132 and 134. Extending through and movable in slots 132 and 136 is a rod 140. Likewise, extending through and movable in slots 134 and 138 is a rod 142. Rods 140 and 142 are biased together by a pair of tension springs 144 and 146 which are connected between rods 140 and 142.

A pair of washers 148 carried by rod 140 and held in place by cotter keys 150 serve to retain rod 140 in slots 132 and 136. Likewise, a pair of washers 152 carried by rod 142 and held in place by cotter keys 154 serve to retain rod 142 in slots 134 and 138.

It will now be apparent that the bias of tension springs 144 and 146 tends to pull rods 140 and 142 together in their respective slots with the result that plates 128 and 130 are connected for conjoint rotation, and further that such conjoint rotation takes place without any lag for tension to be built up on springs 142 and 146 since they already are under tension. Also, by overcoming the bias of springs 144 and 146, plates 128 and 130 can be rotated independently of each other. Thus, movement of either control handle causes, without lag, a corresponding movement of both lever arms 58 and 86 which control the swash plates of pumps 50 and 78. On the other hand, control handles 32 and 34 can be actuated independently by overriding the bias of springs 144 and 146 with the result that swash plates of pumps 50 and 78 can be actuated independently of each other.

It is desirable to have the swash plates of pumps 50 and 78 normally biased to their zero displacement positions. This is accomplished by centering mechanism 156 which biases plates 130 and 132 to a predetermined position. Mechanism 156 includes a roller 158 connected to plate 128 and a roller 160 connected to plate 130. These rollers engage a generally V-shaped cam 162 which is pivotally connected to bracket 120 by means of a sleeve shaft 164 carried by a rod 166 which extends between two legs of bracket 120. Cam 162 is biased into engagement with rollers 158 and 160 by means of a compression spring 168 which is disposed between cam 162 and a backing plate 170 which extends across bracket 120. Thus, regardless of which direction rollers 158 and 160 move along cam 162, the bias of spring 168 will tend to return them to the apex of the cam, and so tend to bring plates 128 and 130 back to a predetermined position.

Figure 7:
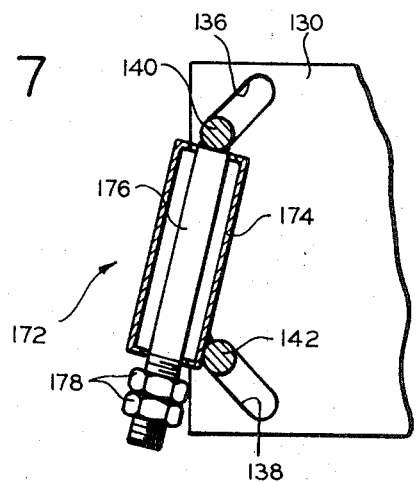
FIG. 7 is a sectional view along the line 7—7 in FIG. 4.

Referring now specifically to FIG. 7, there is provided mechanism 172 for limiting the relative rotation of plates 128 and 130, and hence relative displacement of the swash plates of pumps 50 and 78. Mechanism 172 includes a tube 174 fixed to rod 142, preferably by welding and a rod 176 which extends through tube 174 and is connected at one end thereof to rod 140 by welding and which has a pair of lock nuts 178 threadably connected to the other end of rod 176 to serve as a stop with the adjacent end of tube 174. Thus, by adjusting the clearance between nuts 178 and tube 174 (the distance nuts 178 are threaded onto rod 176) the relative movement that will be permitted between plates 128 and 130 can be regulated.

In order to aid persons skilled in the art to better understand my invention, I will now explain the operation of it. It will be assumed that loader 10 is standing still and that the operator desires to move forwardly in a straight line. In order to accomplish this the operator need merely push either one of control handles 32 or 34 forward (clockwise as viewed from the right in FIG. 3). The further forward the control handle is pushed the faster the vehicle will operate. Loader 10 will proceed in a straight line because both handles 32 and 34 will be displaced the same amount due to the action of mechanism 126, and so fluid motors 52 and 80 will be driving the wheels on each side of the vehicle at the same speed and in the same direction. If it is now desired to change the heading of the vehicle toward the right the operator may either move control handle 32 backward relative to handle 34 or move control handle 34 forward relative to handle 32. In either event the result is that the wheels on the left side of the vehicle will be driven at a greater speed than the wheels on the right side so that the vehicle will turn toward the right. When the turn is completed the operator can release either one of the two control handles and tension springs 144 and 146, acting through pins 140 and 142 will restore plates 128 and 130 to identical positions, thereby disposing the swash plates of pumps 50 and 78 in the same position so that the motors will again be driving their corresponding wheels at the same rate of speed. While only the manipulation of control handles 32 and 34 has been explained to accomplish either straight forward movement or a right hand turn of loader 10, it will be understood that left hand turns, reverse drive or pivoting loader 10 about its centerpoint can be accomplished through proper manipulation of control handles 32 and 34. In any case, mechanism 126 tends to cause conjoint movement of plates 128 and 130, and hence like movement of the swash plates of pumps 50 and 78. However, relative movement of plates 128 and 130, and hence displacement of the swash plates of pumps 50 and 78 relative to each other, can be accomplished by the operator pushing or pulling on control handles 32 and 34 sufficiently to overcome the bias of tension springs 144 and 146 with the result that rods 140 and 142 cock and slide in their respective slots in plates 128 and 130. The amount of differential movement of plates 128 and 130 is limited by the clearance between nuts 178 and the adjacent end of tube 174 of mechanism 172 which connects rods 140 and 142. If the operator has control handles 32 and 34 in any position displaced from their normal neutral position and releases them, they are brought to a predetermined neutral position through the action of spring 168 which bears on cam 162 and causes rollers 158 and 160 to roll to the apex of the cam. When plates 128 and 130 are brought to this position the swash plates of pumps 50 and 78 which are connected thereto through the linkage are disposed at zero displacement so that drive train 36 of loader 10 is in neutral.

While only a single preferred embodiment has been described in the foregoing detailed description, it is understood that this description is illustrative only and that various changes and modifications can be made to my invention without departing from the spirit and scope of it. Consequently, the limits of my invention should be determined from the claims attached hereto.

I claim:

1. For use with a vehicle having first and second separate drive means, the combination comprising first means for controlling the first drive means, second means for controlling the second drive means, means interconnecting said first and second controlling means so that actuation of one of said controlling means tends to cause substantially the same actuation of the other of said controlling means, said interconnecting means being overridable so that said first and second controlling means can be actuated independently of each other, and means connected to said interconnecting means for limiting the amount of independent actuation of one of said controlling means relative to the other of said controlling means.

2. The combination comprising first and second separate variable output drive means, a first rotatable shaft operatively connected to said first drive means so that rotation of said first shaft varies the output of said first drive means a second rotatable shaft operatively connected to said second drive means so that rotation of said second shaft varies the output of said second drive means, interconnecting means connected to said shafts so that rotation of one of said shafts tends to cause substantially the same rotation of the other of said shafts, said interconnecting means being overridable so that said shafts can be rotated independently of each other, and means connected to said interconnecting means for limiting the amount of independent rotation of said shafts relative to each other.

3. The combination set forth in claim 2 and including means connected to said interconnecting means for biasing said shafts to a given position.

4. The combination as set forth in claim 2 and including a first control handle connected to said first shaft and a second control handle connected to said second shaft.

5. The combination as set forth in claim 2 wherein said interconnecting means includes a first plate fixed to said first shaft, a second plate fixed to said second shaft, first and second converging slots in said first plate, third and fourth converging slots in said second plate, a first rod which extends through and is movable in said first and third slots, a second rod which extends through and is movable in said second and fourth slots, and tension spring means connected between said first and second rods.

6. The combination as set forth in claim 5 and including first and second rollers connected to said first and second plates, respectively, a curved cam engaging said rollers and means biasing said cam against said rollers so that said shafts are biased to a given position.

7. The combination as set forth in claim 5 and including a tube fixed to one of said rods, a third rod extending through said tube and fixed to the other of said first and second rods, and stop means connected to said third rod and cooperating with said tube so that rotation of said shafts relative to each other is limited to a given amount.

8. The combination with a vehicle having a power train with first and second separate variable outputs, mechanism for controlling the power train comprising a rotatable sleeve shaft operatively connected to the power train to control the first variable output, a second rotatable shaft disposed to extend through said sleeve shaft and operatively connected to the power train to control the second variable output, a first plate fixed to said sleeve shaft, a second plate fixed to said second shaft and spaced axially from said sleeve shaft, said first plate having first and second converging slots therein, said second plate having third and fourth converging slots therein which register with said first and second slots, respectively, a first rod which extends through and is movable in said first and third slots, a second rod which extends through and is movable in said second and fourth slots, tension spring means connected between said first and second rods, means for retaining said first and second rods in said slots, a tube fixed to one of said first and second rods, a third rod fixed to the other of said first and second rods and extending through said tube, stop means connected to said third rod so that relative rotation between said shafts is limited to a predetermined amount, first and second rollers connected to said first and second plates, respectively, a cam disposed to engage said rollers and means biasing said cam toward said rollers so that said shafts are biased to a given position.

References Cited

UNITED STATES PATENTS 3,333,485　8/1967　Deli et al. _____ 74—479

FOREIGN PATENTS 940,561　10/1963　Great Britain _____ 74—480

MILTON KAUFMAN, Primary Examiner

U.S. Cl. X.R.

74—491; 180—6.48

UNITED STATES PATENT OFFICE
CERTIFICATE OF CORRECTION

Patent No. 3,605,519            Dated September 20, 1971

Inventor(s) John P. Heggen

It is certified that error appears in the above-identified patent and that said Letters Patent are hereby corrected as shown below:

Column 1, line 71, after "numeral 10" insert -- denotes generally a compact four-wheeled front end --

Column 2, line 71, delete "denotes generally a compact four-wheeled front end"

Signed and sealed this 19th day of September 1972.

(SEAL)
Attest:

EDWARD M. FLETCHER, JR.          ROBERT GOTTSCHALK
Attesting Officer                    Commissioner of Patents